July 4, 1972    G. B. HICKNER ET AL    3,674,318
ANTI-SKID BRAKING SYSTEM UTILIZING PRESSURE FEEDBACK
Filed Nov. 18, 1970    2 Sheets-Sheet 1

DONALD W. HOWARD
WARD C. SUTTLE
GEORGE B. HICKNER
    *INVENTORS.*

BY *Plante, Hartz, Smith
& Thompson*

AT TORNEYS

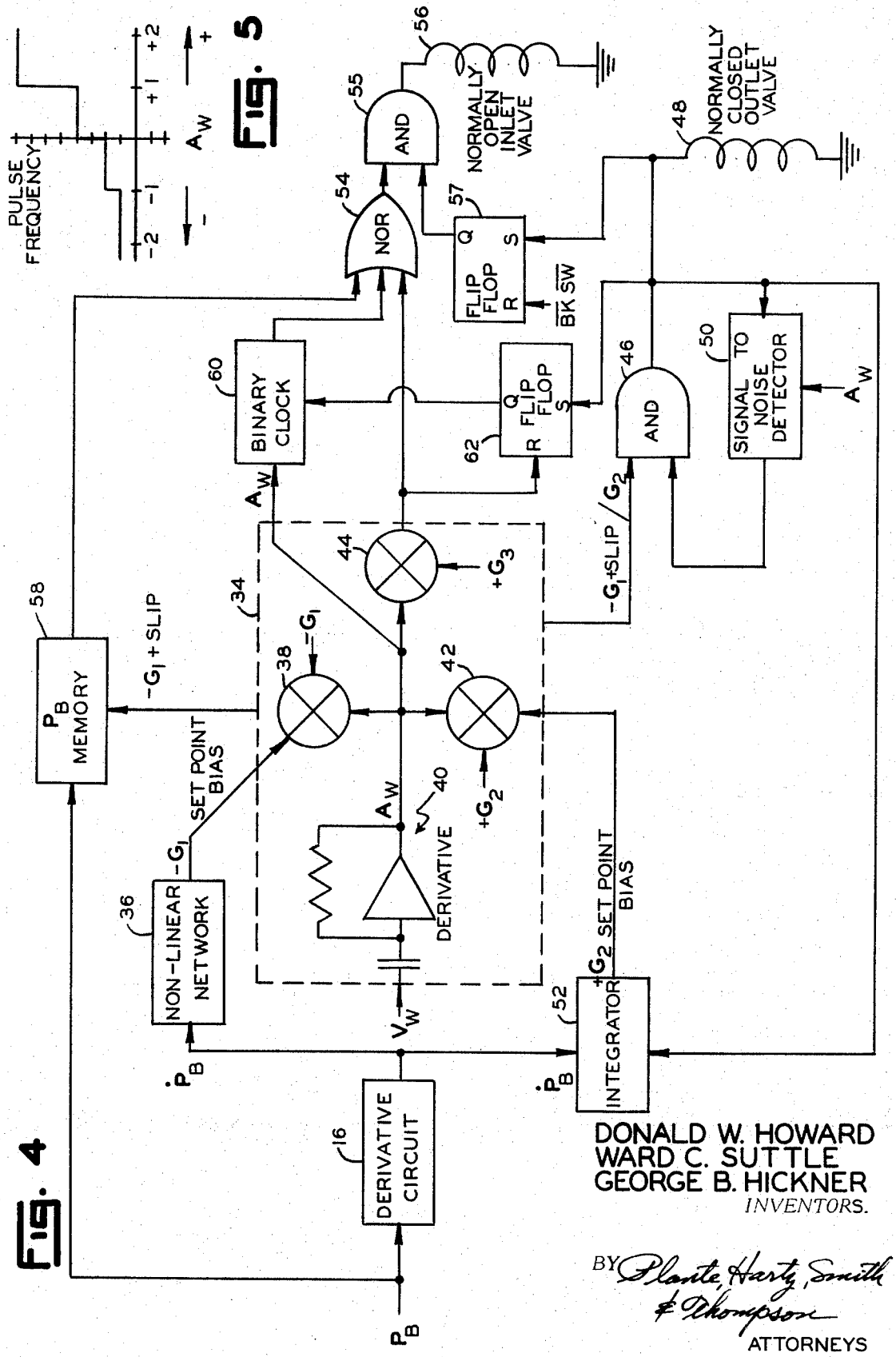

United States Patent Office 3,674,318
Patented July 4, 1972

1

3,674,318
ANTI-SKID BRAKING SYSTEM UTILIZING
PRESSURE FEEDBACK
George B. Hickner, Donald W. Howard, and Ward C. Suttle, South Bend, Ind., assignors to The Bendix Corporation
Filed Nov. 18, 1970, Ser. No. 90,536
Int. Cl. B60t 8/06
U.S. Cl. 303—21 A
12 Claims

ABSTRACT OF THE DISCLOSURE

An adaptive braking system to prevent skidding of an automotive vehicle by reducing the brake pressure yet maintaining near maximum braking torque. A transducer measures the brake pressure to provide an additional input to control logic already including inputs from wheel speed sensors and a vehicle acceleration sensor or vehicle speed sensor. The maximum pressure on each cycle is memorized and a percentage value used to insure that on the next cycle the pressure build will not be prematurely terminated. A derivative of the brake pressure is used to change a first set point in accordance with pressure application rates. The first set point activates the anti-skid system. A noise detector that senses changes in wheel acceleration will prevent a premature decay of braking pressure caused by rough road surfaces. A variable frequency clock is used to provide a signal of a frequency proportional to wheel acceleration to slowly approach the point of maximum torque.

BACKGROUND OF THE INVENTION

This invention is an improvement on U.S. Pat. No. 3,494,671, having a common assignee with the present invention.

Prior to the present invention many different anti-skid systems for automotive vehicles have been proposed. Most of these systems use a sensor to detect the rotational velocity of the wheels of the vehicle, or an average rotational velocity as sensed in the drive line linkage of the drive wheel. From the wheel speed sensor, the derivative can be taken to determine wheel acceleration. Some systems, using only the output from the wheel speed sensor, will try to analyze the condition between the automotive vehicle speed and the wheel speed to maintain maximum braking condition. However, due to varying road conditions this analysis is practically impossible.

Other anti-skid control systems utilize the output from wheel speed sensors and an acceleration control switch to give increased system performance. By utilizing an acceleration control switch, the additional information is provided to indicate when the vehicle is on a high or low coefficient surface. By appropriate processing of the output from the wheel speed sensors and the acceleration control switch, a better system was developed to help prevent the skidding of an automotive vehicle during a brake application. In the first described system that only has wheel speed sensors, a fixed percent slip between the vehicle wheels and the road surface, or wheel acceleration set points, were utilized to vary the brake pressure thereby attempting to stop incipient skid conditions. However, due to varying road surface conditions, a fixed percent slip, or given set points, will not stop skidding of the automotive vehicle under these varying conditions and give optimal braking. By the inclusion of the acceleration switch, increased systems performance was obtained. The percent slip or the wheel acceleration set point could be changed according to the surface condition.

Some very recent systems proposed the use of the Doppler radar to sense the true ground speed of the vehicle so there will be no need to simulate the relationship between the rotational velocity of the wheels and the speed of the automotive vehicle. Utilizing the vehicle speed sensor, i.e., Doppler radar, and the wheel speed sensor, a percent slip can be developed. With the acceleration switch, the percent slip can be varied to meet varying road surface conditions. Although the system performance on the latter mentioned anti-skid systems is greatly improved over the original versions, there are still some problems that occur while varying the brake pressure to maintain maximum braking torque between the vehicle wheels and the road surface.

In a system utilizing a modulator with input and output valves to vary the braking pressure of the automotive vehicle, some of the problems are as follows: first, a premature firing of the valve due to initial application rate of the driver applied brake; second, brake pressure undershoot wherein the input valve is closed before a brake pressure producing near maximum braking torque is reached; and third, a low ratio of high pressure build to low pressure build rates is possible particularly on low coefficient surfaces. The present application minimizes these problems that exist in previous systems to help maintain the maximum braking torque on wheel automotive vehicles.

SUMMARY OF THE INVENTION

It is an object of the present invention to utilize pressure feedback to modify signals that are used to vary brake pressure thereby maintaining a near maximum braking torque resulting in a decreased stopping distance and increased lateral stability of the automotive vehicle.

It is another object of the present invention to provide an additional voltage feedback loop whereby solenoid valves of a hydraulic modulator in an anti-skid system will have a faster reaction time.

It is still another object of the present invention to modify the start of pressure decay of an existing control unit in an adaptive braking system by utilizing a characteristic function of brake pressure to brake torque.

It is a further object of the present invention to utilize a pressure memory circuit to prevent premature termination of a high pressure build rate in a brake pressure modulator and a gated clock to proportionally pulse an input valve so that the pressure build rate becomes less as the point of maximum road torque is approached after being quickly returned to a near maximum point.

It is an even further object of the present invention to modify the operation of the pressure decay valve in an adaptive braking system thereby preventing premature pressure decay and subsequent loss of braking torque.

It is an even further object of the present invention to obtain the rate of change of brake pressure and modify a first set point by a non-linear characteristic of the rate of change, and a second set point by integrating the rate of change of pressure. A pressure build valve, normally controlled by a third set point, can be extended by a pressure memory circuit or a variable clock. An outlet solenoid which is normally controlled by the second set point, or the first set point and a given function of speed, can be inhibited when a noise level in wheel acceleration has been exceeded.

The present invention solves the problems that existed in previous control logic for adaptive braking systems. The present system is less sensitive to initial ramp rate thereby preventing a premature firing of the solenoid valves on the first cycle. An integration of the pressure decay rate can be used to change the bias of a set point thereby tending to anticipate the minimum pressure needed to maintain maximum torque balance of the wheel. This helps resolve the pressure undershoot characteristic brought on by the need for relatively high pressure decay rates. The third problem is to maintain a low ratio of high build to low build time, particularly on low coefficient surfaces to give maximum braking torque. A pressure memory is incorporated to retain high build until a given percentage of the previous cycle has been obtained. Thereafter, the slow build is pulsed at a variable frequency determined by the wheel acceleration.

BRIEF DESCRIPTION OF THE DRAWINGS

FIG. 4 is a diagrammatic illustration of how a previous control unit of an adaptive braking system can be modified by pressure feedback to maintain near maximum road torque.

FIG. 5 is a graphic illustration of the pulse frequency of a binary clock shown in FIG. 4.

DESCRIPTION OF THE PREFERRED EMBODIMENT

Figure 1:
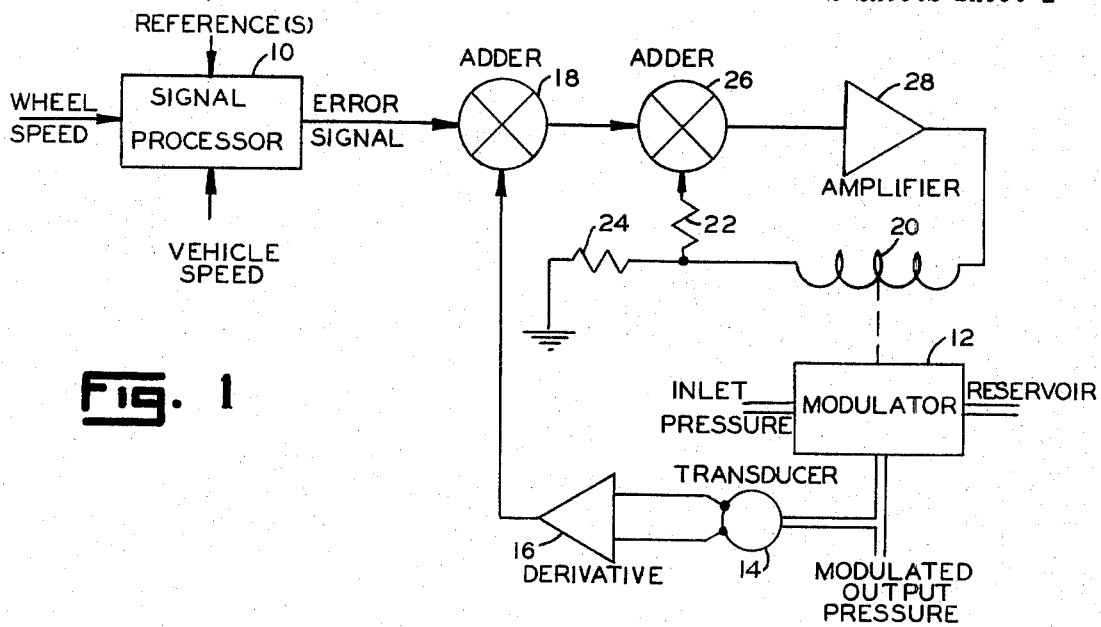
FIG. 1 is a pictorial block diagram of a portion of a control unit of an adaptive braking system illustrating pressure feedback to modify the error signal, and including voltage feedback to decrease response time.

Referring now to FIG. 1 of the drawings, a signal processor 10 receives signals that indicate the rotational velocity of the wheels, and, in some cases, a signal that indicates the vehicle speed. The vehicle speed may be measured directly or the vehicle speed can be computed from the wheel rotational velocity. The signal processor has certain reference inputs that give an error signal output if predetermined reference levels have been exceeded. Other types of signal processors may give an error signal output if a given percent slip has been exceeded. In previous adaptive braking systems, the error signal has been used to control the modulator 12 thereby attempting to prevent a skid condition of the automotive vehicle.

In the present system, a transducer 14 has been included to modify the error signal thereby providing a more reliable anti-skid system under varying road surface conditions. The transducer 14 is connected to the modulated output pressure. The inlet pressure of the modulator 12 is received from the master cylinder (not shown). The transducer 14 transforms the modulated output pressure into electrical energy. The transducer 14 may be of the solid state bridge type or a pressure sensitive transistor. The output of the transducer 14, which has been sufficiently amplified, is fed into derivative circuit 16 to obtain the rate of change of the pressure supplied through the modulator 12 to the brake cylinder (not shown). The error signal from the signal processor 10, and the rate of change of brake pressure from the derivative circuit 16, are fed into adder 18. The adder 18 combines the error signal and the rate of change of brake pressure in such a manner that the set points or percent slip from signal processor 10 is modified in response to varying rates of brake application.

The output from adder 18 is used to control solenoid 20 which operates the valving of modulator 12 to prevent further pressure increases in the wheel cylinder and, if necessary, subsequent release of brake pressure through the modulator 12 to the reservoir. To provide increased response time of the solenoid 20, a feedback circuit consisting of voltage dividing resistor 22 and 24 connects to solenoid 20. Voltage dividing resistor 24 connects to ground and voltage dividing resistor 22 feeds back into adder 26 to boost the output voltage from adder 18. Amplifier 28 gives the necessary drive to operate solenoid 20.

It should be emphasized that FIG. 1 has two essential features. One feature consists of the feedback loop utilizing transducer 14 to give an output that is proportional to the brake pressure. The rate of change of this brake pressure, as determined from derivative circuit 16, is used to modify the error signal from signal processor 10 to provide increased brake torque under varying road surface conditions. Another feature is increased response time provided by the feedback loop formed voltage dividing resistor 22 and 24 and adder 26.

Figure 2:
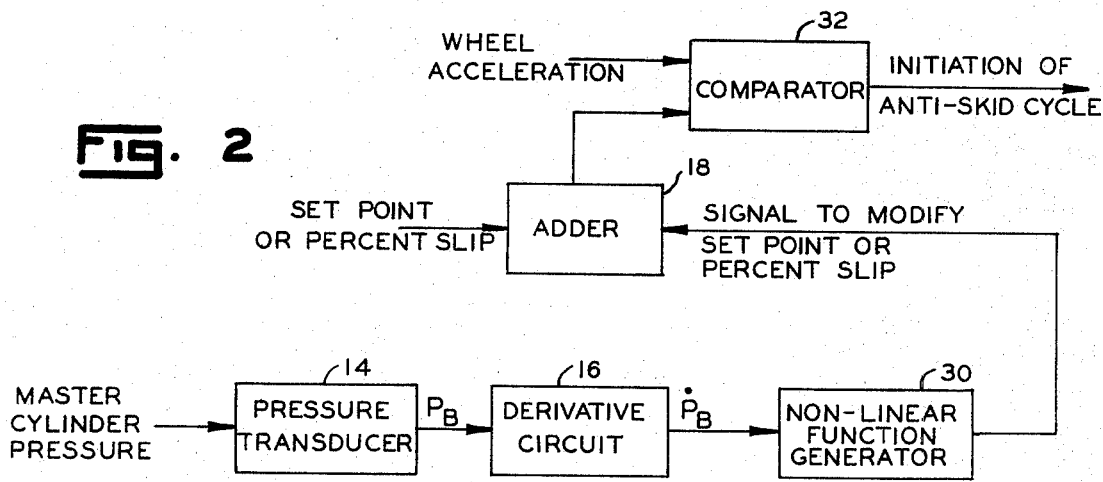
FIG. 2 is a block diagram showing how a pressure signal can be used to modify acceleration set points or percent slip in the control logic of an adaptive braking system.
Figure 3:
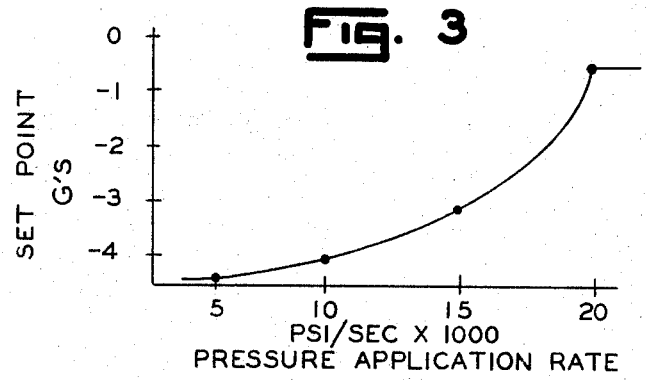
FIG. 3 is an illustrative graph of how the set points of the control logic can be modified in accordance with pressure application rate as shown in the block diagram shown in FIG. 2.

Referring now to FIG. 2, the essence of the invention as previously described in conjunction with FIG. 1, is shown in block diagram form. The master cylinder pressure, which is the same as the modulated output pressure in FIG. 1, feeds into a pressure transducer 14 to give an electrical signal represented by the letter $P_B$ which is proportional to brake pressure. The derivative circuit 16 determines the rate of change of the brake pressure and is represented by the letter $\dot{P}_B$. Since the characteristics between brake pressure and brake torque are not necessarily linear, a non-linear function generator 30 has been included. The non-linear function generator 30 transforms the relationship between brake pressure and brake torque into a linear output, which is used to modify the set point or the percentage slip of an anti-skid control system. An example of one such anti-skid control system can be found in previously mentioned Pat. No. 3,494,671. The set point or percentage slip is fed into adder 18 along with the output of the non-linear function generator 30. The output of adder 18 which is a modified set point or percent slip is compared against wheel acceleration in comparator 32. When the wheel acceleration exceeds the set point or the percent slip, comparator 32 gives an output that initiates the anti-skid cycle. FIG. 3 shows in a general relationship as to how the set points, as measured in G's, can be modified in non-linear function generator 30 to change set points or percent slips as a function of pressure application rates.

The portion contained within the dotted line 34 of FIG. 4 is an illustrative representation of a portion of a control unit for an adaptive braking system similar to the type shown in previously mentioned U.S. Pat. No. 3,494,671. The electric signal representing brake pressure $P_B$ is received from a pressure transducer. The brake pressure $P_B$ which feeds into derivative circuit 16 determines the rate of change of brake pressure $\dot{P}_B$. The rate of change of brake pressure $\dot{P}_B$ feeds through non-linear network 36 to modify the bias of a $-G_1$ set point as determined by the comparator 38.

For further description of the G set points, reference can be made to the previously mentioned patent. The set points in this particular application $-G_1$, $+G_2$ and $+G_3$ correspond to $-G_1$, $+G_1$ and $+G_2$, respectively, of the previously mentioned patent. The reason for the change in nomenclature of the G set points resides in the fact that the absolute values of $-G_1$ and $+G_2$ of the present application are not necessarily equal as normally are the absolute values of $-G_1$ and $+G_1$ of the previously mentioned patent.

The wheel velocity $V_W$ obtained from a speed sensor (not shown) is fed into control portion 34 and into derivative circuit 40 to obtain wheel acceleration $A_W$. The wheel acceleration $A_W$ is fed into comparator 38 so that when the $-G_1$ set point is exceeded, an output will be generated. Also, the wheel acceleration $A_W$ feeds into comparator 42 so that when the $+G_2$ set point has been exceeded by positive acceleration of the vehicle wheel, a second output will be generated. Modification of the bias of $+G_2$ set point will be subsequently described. To obtain the $+G_3$ set point, the wheel acceleration $A_W$ is fed into comparator 44 which generates an output when the $+G_3$ reference voltage has been exceeded.

One of the problems in the present adaptive braking system resides in the sensitivity of the adaptive braking system to initial build rate as represented by $\dot{P}_B$. Therefore, the non-linear network 36, as shown in FIG. 4, is used to change the bias of the initial set point thereby advancing or delaying air valve firing as the case may require. Also, to help solve the problems of sensitivity to initial pressure build rates, an inhibit AND gate 46 has been included between the $-G_1$+slip and $+G_2$ output from control portion 34 which is used to energize coil 48 of the normally closed outlet valve of a pressure modulator. A signal-to-noise ratio detector 50 normally supplies an input voltage to inhibit AND gate 46, thereby allowing an output to energize coil 48 when $-G_2$+slip is received, and terminating at $G_2$. The signal-to-noise ratio detector 50 which is activated by a brake switch (not shown) receives a wheel acceleration signal $A_W$. If the wheel acceleration $A_W$ crosses the zero axis a predetermined number of times within a given time period, a signal-to-noise detector 50 will drop the output voltage fed into inhibit AND gate 46 for a certain length of time. During this length of time the normally closed outlet valve will not open because coil 48 has no way of being energized. The signal-to-noise detector 50 helps prevent the premature firing of the outlet valve to decay brake pressure. Previous to the present invention, this has been a problem on roads having a rough surface condition. If the inhibit AND gate 46 gives an output before the signal-to-noise detector 50 has obtained a predetermined count, then the signal-to-noise detector 50 will be reset by the voltage used to energize coil 48. On subsequent cycles, the signal-to-noise detector 50 will start with a zero count. It should be clear that the signal-to-noise detector 50 and inhibit AND gate 46 may be used on the initial cycle only, or upon all cycles in an adaptive braking system. Also, the non-linear network 36 may be used only on the initial cycle, or on all cycles of an anti-skid system.

Another problem which is pressure undershoot is brought about by the need for relatively high pressure build rate coupled with the time delay between brake pressure changes and wheel acceleration information. An integration of the rate of change of brake pressure $P_B$ is performed by integrator 52. The integrator 52 gives an output which is essentially equal to brake pressure $P_B$ without constant valves associated therewith. The output of integrator 52 is used to change the bias of the $+G_2$ set point, as determined by comparator 42. This tends to move the $+G_2$ set point towards the $-G_1$ set point as determined by the rate-time function output of the integrator 52. In effect, this would tend to anticipate the minimum pressure needed to obtain a torque balance between the wheel and the road surface thereby providing a near maximum braking efficiency.

Another problem is to provide a low ratio of high build time to low build time, particularly on low coefficient surfaces. This means that when an incipient skid condition is sensed, the brake pressure is reduced. When the skid condition no longer exists, brake pressure should be restored to a condition just below the maximum braking efficiency as rapidly as possible. Then the point of maximum braking efficiency should be slowly approached by a slow pressure build rate. The rapid pressure build rate is determined when an output is received from comparator 44 that indicates the $+G_3$ set point has been exceeded by wheel acceleration $A_W$ and the output is received by NOR gate 54 to de-energize coil 56 of the normally open inlet valve. As long as any input is received on NOR gate 54, the coil 56 will remain de-energized. If no input is being received by NOR gate 54, coil 56 will be energized closing the inlet valve. To keep the coil de-energized until a skid condition is sensed, AND gate 55 and flip-flop 57 have been included. Until flip-flop 57 is set by the output from AND gate 46 which signifies a skid condition, the AND gate 55 will not receive the Q output from flip-flop 57. On subsequent cycles, the AND gate 55 and flip-flop 57 will not interfere with the pressure modulation unless the flip-flop 57 is reset due to a release of the brake switch indicated by $\overline{BK}$ $\overline{SW}$.

To retain the fast pressure build rate after $+G_3$ is no longer exceeded and consequently an output is not received by NOR gate 54 from comparator 44, a $P_B$ memory 58 has been included. The $P_B$ memory 58 memorizes the pressure when $-G_1$+slip has been obtained. The $P_B$ memory 58 uses a percentage of the memorized pressure as a target value for the high build portion of a cycle. The percentage of the value could be anywhere from 70 to 90 percent of the memorized pressure. The pressure memory 58 therefore maintains a voltage input to NOR gate 54 until the pressure has attained this percentage value. By a rapid build to a brake pressure slightly below the brake pressure for maximum braking torque, this will give additional braking force throughout the stop with a possible small increase in the basic cyclic rate on some road surfaces with the increase being dependent upon the magnitude of the low pressure build rate.

As a further degree of control, a binary clock 60 has been included to pulse modulate the normally open inlet valve after inputs from the $P_B$ memory 58 and comparator 44 are no longer fed into NOR gate 54. The binary clock 60 has an output frequency proportional to the wheel acceleration $A_W$ only when flip-flop 62 has been reset by the output from comparator 44. The frequency of the pulsed output from binary clock 60 is dependent upon the wheel acceleration $A_W$. As shown in the graphic illustration in FIG. 5, the pulse frequency is of a higher value when wheel acceleration is of a high positive value. The pulse frequency of the binary clock decreases as wheel acceleration $A_W$ passes through zero and further decreases as wheel acceleration goes in the negative direction. This will provide a gradual approach of brake pressure to the point of maximum brake torque. This varying pulse frequency modulation tends to maintain the brake pressure slightly below the maximum brake torque thereby resulting in increased braking efficiency throughout the vehicle stop. The opening of the normally closed valve will set flip-flop 62 thereby inhibiting further outputs from binary clock 60 until reset by an output from comparator 44.

What is claimed is:

1. A control portion of an adaptive braking system of a wheeled vehicle, said control portion comprising:
   means for sensing rotational velocity of the wheels of said vehicle;
   means for determining speed of said wheeled vehicle;
   means for processing signals from said velocity sensing means and said speed determining means which are proportional to said rotation velocity and said vehicle speed, respectively, said processing means giving an error signal output when predetermined references have been exceeded;
   means for varying brake pressure in response to said error signal output to prevent the wheels from skidding on a road surface;
   transducer means for sensing said brake pressure and giving a correction signal proportional thereto; and
   means for correcting said error signal output in response to said correction signal to help maintain maximum torque between the wheels and the road surface.

2. The control portion, as set forth in claim 1, wherein said correcting means includes:
   derivative means for obtaining a rate of change of said correctional signal; and
   means for combining said rate of change of said correctional signal with said error signal.

3. The control portion, as set forth in claim 2, further comprising feedback means for decreasing response time of said varying means when said error signal output has been received.

4. The control portion, as set forth in claim 1, wherein said correcting means includes:
   means for taking the derivative of said correctional signal to obtain rate of change of said brake pressure;
   means for generating a non-linear function from said rate of change of said brake pressure; and means for comparing said non-linear function with said predetermined references to modify said error signal output by changing a first of said predetermined references.

5. The control portion, as set forth in claim 4, wherein said correcting means includes:
means for memorizing said correctional signal when wheel deceleration exceeds said first predetermined reference; and
means for taking a percentage of said memorized correctional signal, said percentage taking means providing a termination point for high pressure build slightly below the point of maximum braking torque.

6. The control portion, as set forth in claim 4, wherein said correcting means includes means for integrating said rate of change of said brake pressure, said integrating means modifying a second of said predetermined references thereby changing said error signal output.

7. The control portion, as set forth in claim 1, wherein said correcting means includes a variable frequency clock to provide different pressure build rates for different road surface conditions thereby helping maintain maximum braking torque.

8. The control portion, as set forth in claim 1, wherein said correcting means includes means for detecting noise level from wheel acceleration to determine road surface conditions, said detecting means preventing a premature decay in brake pressure.

9. A control portion of an adaptive braking system for an automotive vehicle, said control portion comprising:
means for sensing wheel rotational velocity;
first derivative means for determining wheel acceleration from wheel rotational velocity;
transducer means for measuring brake pressure;
second derivative means for determining rate of change of said brake pressure;
means for comparing said wheel acceleration to give first, second and third set points when predetermined values have been exceeded;
first means for modifying said first set point in accordance with rate of change of said brake pressure to help maintain a maximum braking torque under varying road conditions; and
second means for modifying said second set point by integrating the rate of change of said brake pressure;
said set points determining how a brake pressure modulator in an adaptive braking system is modulated to help maintain maximum braking force.

10. The control portion, as set forth in claim 9, comprising means for detecting noise to prevent a premature reduction in brake pressure on rough road surfaces.

11. The control portion, as set forth in claim 10, comprising means for gradually approaching the brake pressure that produces maximum braking force, said gradually approaching means including:
brake pressure memory to maintain pressure build until a predetermined percentage of the maximum brake pressure on an immediately previous cycle is obtained; and
means for proportionally increasing brake pressure to give a smaller rate of pressure build as said wheel acceleration increases.

12. The control portion, as set forth in claim 11, wherein:
said noise detecting means includes a digital filter for counting the number of times wheel acceleration passes through zero; and
said proportionally increasing means includes a binary clock with a plus frequency directly related to wheel acceleration.

References Cited
UNITED STATES PATENTS

| | | | |
|---|---|---|---|
| 3,494,671 | 2/1970 | Slavin | 303—21 P |
| 3,545,817 | 12/1970 | Yarber | 303—21 P |
| 3,588,187 | 6/1971 | Mueller | 303—21 P |

RICHARD A. SCHACHER, Primary Examiner

U.S. Cl. X.R.

303—21 P, 21 BE